H. H. BARR.
VEHICLE FENDER.
APPLICATION FILED OCT. 27, 1916.

1,220,930.

Patented Mar. 27, 1917.
3 SHEETS—SHEET 1.

Witnesses

Inventor
H. H. Barr,
By Victor J. Evans
Attorney

H. H. BARR.
VEHICLE FENDER.
APPLICATION FILED OCT. 27, 1916.
1,220,930.
Patented Mar. 27, 1917.
3 SHEETS—SHEET 2.
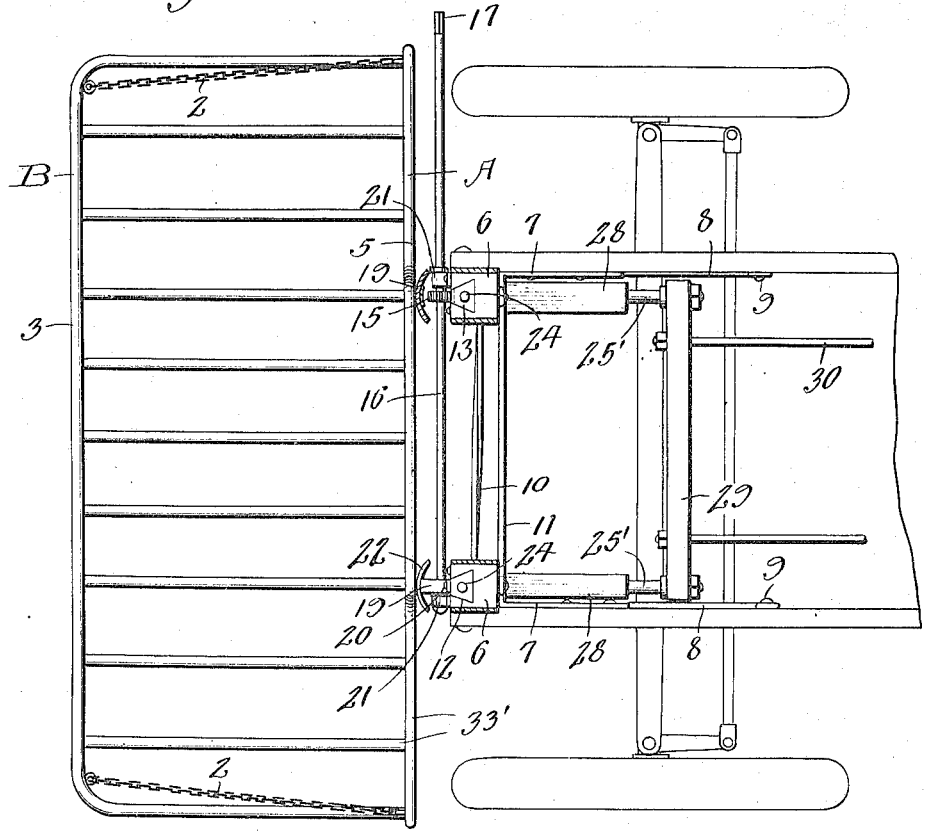
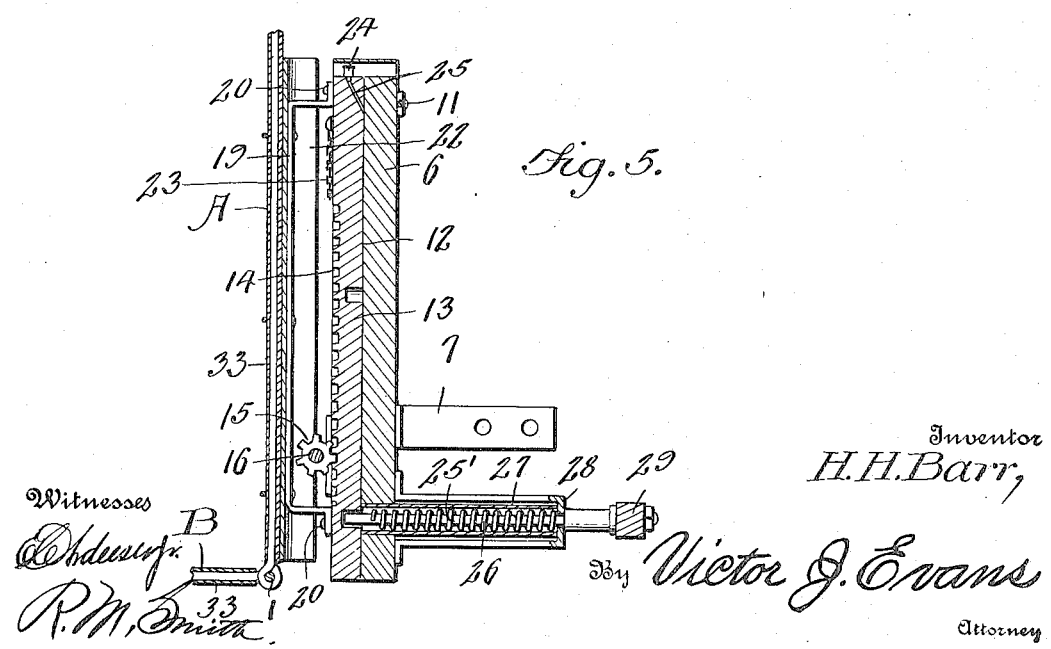
Inventor
H. H. Barr,
By Victor J. Evans
Attorney H. H. BARR.
VEHICLE FENDER.
APPLICATION FILED OCT. 27, 1916.
1,220,930.
Patented Mar. 27, 1917.
3 SHEETS—SHEET 3.
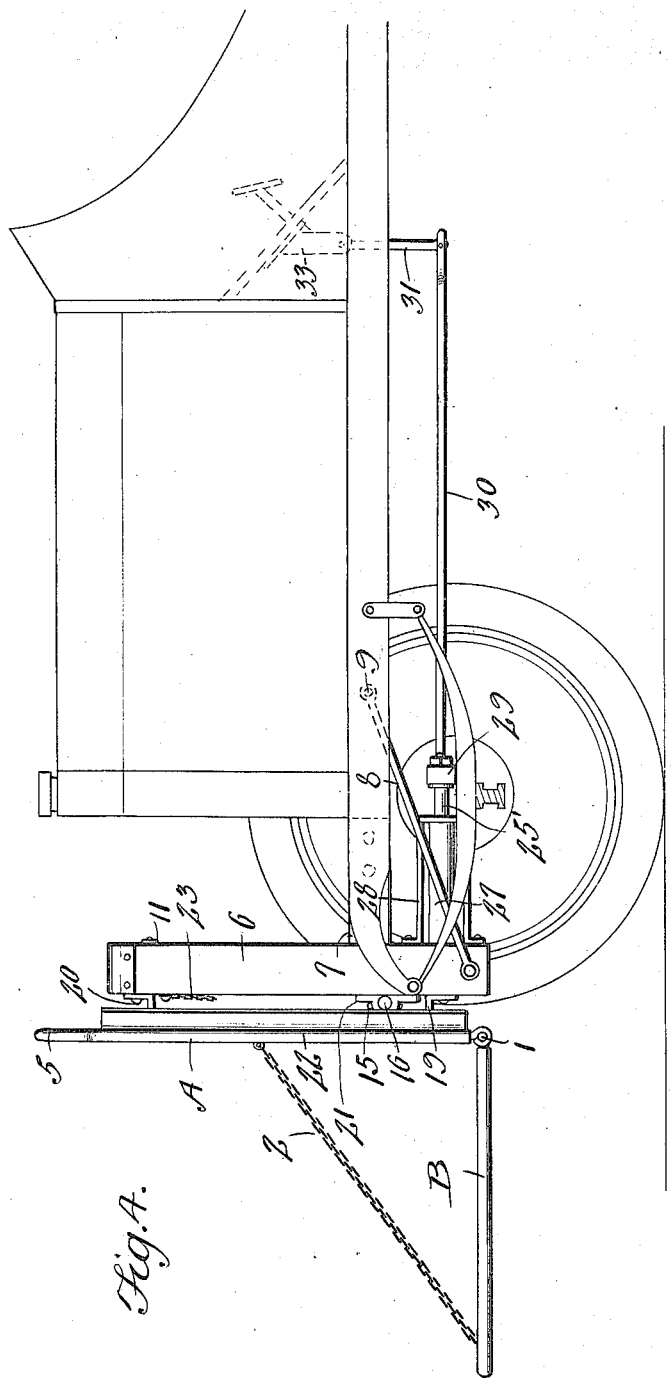
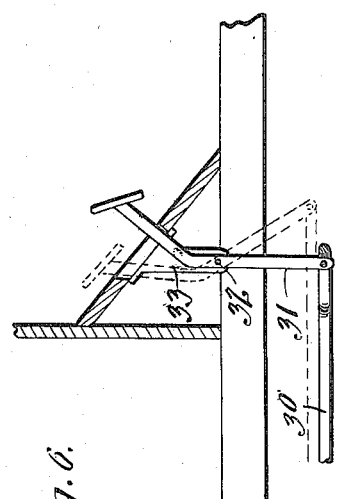
Witnesses
Inventor
H. H. Barr,
By Victor J. Evans
Attorney

UNITED STATES PATENT OFFICE.

HENRY H. BARR, OF SPARTA, WISCONSIN.

VEHICLE-FENDER.

1,220,930. Specification of Letters Patent. Patented Mar. 27, 1917.

Application filed October 27, 1916. Serial No. 128,071.

*To all whom it may concern:*

Be it known that I, HENRY H. BARR, a citizen of the United States, residing at Sparta, in the county of Monroe and State of Wisconsin, have invented new and useful Improvements in Vehicle-Fenders, of which the following is a specification.

This invention relates to vehicle fenders and particularly fenders of the class especially designed to be mounted upon the front of a motor vehicle, the object in view being to provide a fender capable of being carried at a sufficient elevation to give all the necessary road clearance for speeding and also adapted to be dropped by the operator of the car to a predetermined distance from the ground so that persons or objects may be picked up by the fender without injury to persons and without injury to any parts of the mechanism of the motor vehicle.

With the above and other objects in view, the invention consists in the novel construction, combination and arrangement, herein fully described, illustrated and claimed.

In the accompanying drawings:

Fig. 3 is a plan view thereof.

Fig. 4 is a side elevation of the fender as applied to an automobile.

Fig. 5 is a vertical longitudinal section taken in line with one of the latch bolts and sliding supports.

Fig. 6 is a fragmentary vertical longitudinal section taken adjacent to the foot lever and showing the parts associated therewith.

Figure 1:
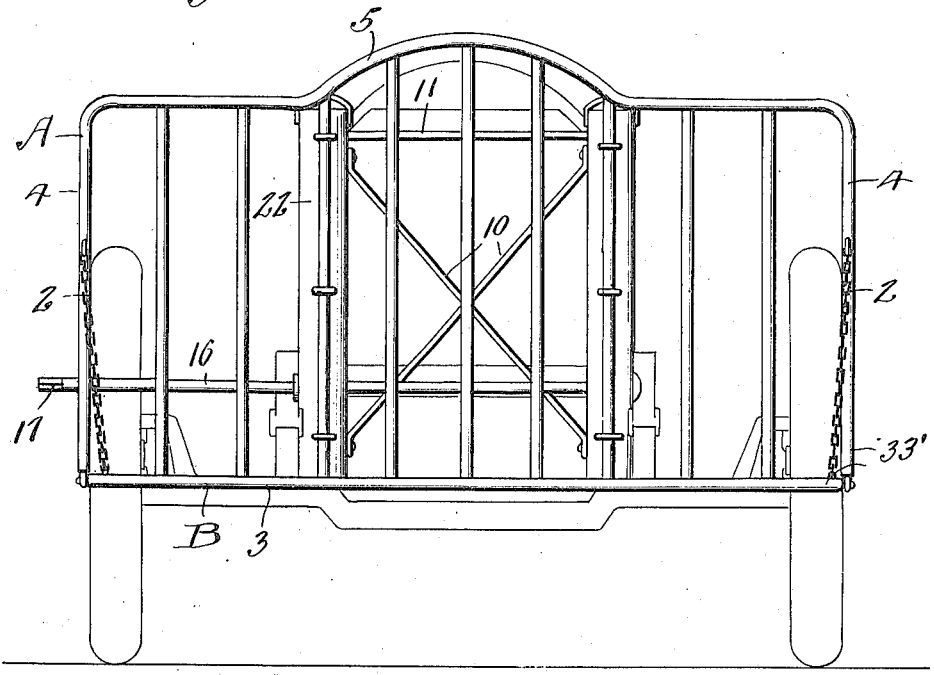
Figure 1 is a front elevation of the fender shown in its applied relation to an automobile and in its normal elevated position.
Figure 2:
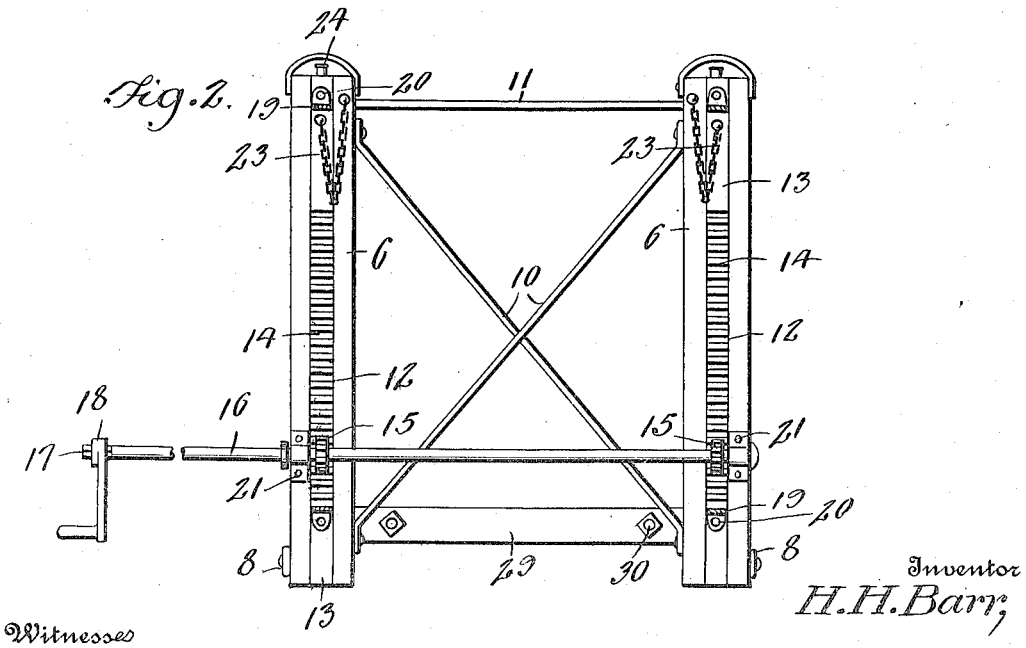
Fig. 2 is a vertical transverse section taken in line with the pinion shaft and looking rearwardly.

The fender proper comprises a main body designated generally at A and a scoop B hinged to the bottom of the main body of the fender by means of a hinge rod 1 and being supported in an approximately horizontal position by means of stay chains 2 terminally fastened at their lower ends to the front bar 3 of the scoop and fastened at their other extremities to the vertical side bars 4 of the main body of the fender. The top bar 5 of the main body of the fender is preferably arched so as to fully cover and protect the radiator of the motor vehicle.

6 designates a pair of hangers arranged in spaced relation to each other and in advance of the side frame bars of the vehicle, said hangers being fastened rigidly to the machine frame by means of supporting arms 7 which are shown as bolted to the machine frame. Braces 8 extend from the lower extremities of the hangers 6 rearwardly to the machine frame to which they are fastened at 9. The hangers 6 are connected in fixed relation to each other by crossed diagonal braces 10 and may also be connected by an additional tie brace 11.

The hangers 6 are formed in their forward faces with guideways 12 of dove-tailed shape in cross section and adapted to receive vertically slidable supports 13 which are also of dove-tailed shape in cross section and adapted to slide vertically in the guideways of the hangers. The forward supports 13 are toothed or in other words said slidable supports are provided with rack faces 14 which are engaged by pinions 15 fast on a pinion shaft 16 extending horizontally and having one end squared as shown at 17 to receive a detachable hand crank 18 by means of which said pinion shaft may be turned for the purpose of elevating the fender after it has been dropped or lowered to its catching position.

Secured to the forward faces of the slidable supports 13 are fender-supporting bars 19 said bars extending vertically and parallel to the sliding supports 13 and having the upper extremities thereof bent at a right angle and extended backwardly where they are secured by fastening means 20 to the slidable supports 13 thus leaving room for the pinion shaft and its pinions and also the bearings 21 for said shaft, said bearings being secured to the forward faces of the hangers 5. Between each of the fender supporting bars and the main body of the fender there is interposed a mud-guard 22 which prevents mud, water and the like from being splashed against the vertically slidable supports 13 which might interfere with the free sliding movement of said supports. Limiting chains 23 are connected at one end to the vertically slidable supports 13 and at their opposite ends to the hangers 6, said chains serving to limit the downward movement of the slidable supports 13 and consequently the fender proper, preventing the latter from resting upon the road surface.

Each of the vertically slidable members 13 is provided at the upper end thereof with an oil cup 24 from which oil is fed through passages 25 to the guideways in which the slidable members 13 operate thus providing for the proper lubrication of the working faces of said slidable supports 13 and the walls of the guideways in which they move.

The means for tripping and dropping the fender comprises a pair of slidable latch bolts 25 each of which is adapted to engage a plurality of notches or sockets in the rear face of the slidable members 13, each of said bolts passing through the adjacent hanger 6 and extending rearwardly therefrom. Each bolt is pressed toward its respective slidable member by means of a coiled expansion spring 26 housed within a tube 27 extending rearwardly from the respective hanger 6 and held in place by a retaining strap 28 secured to the rear side of said hanger.

The latch bolts are connected for simultaneous operation by means of a yoke bar 29 which is fixedly secured to the rear extremities of said latch bolts. Extending rearwardly from the bar 29 is a bridle 30 having pivotally connected thereto the shorter arm of a manually operable tripping lever 31, the same being shown in the form of a foot lever arranged within reach of the operator. The lever 31 is pivotally mounted at 32 on a supporting hanger or bracket 33 bolted to the bottom of the floor of the machine. The notches or sockets engaged by the latch bolts are so arranged that the fender may be locked either in its fully elevated position or at one or more lower positions as may be found desirable by the manufacturer and in accordance with the particular machine in connection with which the fender is used.

From the foregoing description taken in connection with the accompanying drawings it will be understood that the fender proper is normally carried in an elevated position so as to give ample road clearance. At any moment the operator by pressing upon the foot lever may withdraw the latch bolts from engagement with the slidable supports 13 and permit the fender to drop, the connections described and located between said foot lever and latch bolts providing for the simultaneous withdrawal of said latch bolts. In order to again raise the fender to its elevated position, the detachable crank is placed on the end of the pinion shaft and the latter is then rotated, the pinions thereof meshing with the rack faces of the members 13 and moving the latter upwardly until the latch bolts snap into engagement with the desired notches in the members 13. The scoop B may, if desired, be folded upwardly against the main body 9 of the fender and fastened to the same by any suitable means. It is also preferred to inclose all of the bars of the fender in tubular resilient casings 33 for the further protection of any persons struck by the fender.

I claim:

1. The combination with a motor vehicle, of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, and a substantially horizontal shaft journaled in bearings on said hangers and having a rack and pinion engagement with said vertically slidable fender-supporting members.

2. The combination with a motor vehicle, of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, a substantially horizontal shaft journaled in bearings on said hangers and having a rack and pinion engagement with said vertically slidable fender-supporting members, latch bolts slidable in relation to said hangers and movable into and out of engagement with said vertically slidable fender-supporting members, and manually controlled means for simultaneously withdrawing said latch bolts to release and drop the fender.

3. The combination with a motor vehicle, of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, and a substantially horizontal shaft journaled in bearings on said hangers and having a rack and pinion engagement with said vertically slidable fender-supporting members, latch bolts slidably supported in relation to said hangers and movable into and out of engagement with said slidable fender-supporting members, a yoke bar connecting said latch bolts, a manually operable lever, and a bridle connecting said lever with said yoke bar, whereby said latch bolts may be simultaneously shifted out of engagement with the slidable fender-supports to release the latter and permit the fender to drop.

4. The combination with a motor vehicle, of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, a substantially horizontal shaft journaled in bearings on said hangers and having a rack and pinion engagement with said vertically slidable fender-supporting members, and mud-guards interposed between the fender frame and said vertically slidable fender-supporting members.

5. The combination with a motor vehicle, of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, and a substantially horizontal shaft journaled in bearings on said hangers and having a rack and pinion engagement with said vertically slidable fender-supporting members, said slidable fender-supporting members and their guideways being of dovetailed formation in cross section.

6. The combination with a motor vehicle of substantially vertical hangers, means for fastening said hangers in fixed relation to the vehicle frame, said hangers being formed with guideways extending vertically and longitudinally thereof, vertically slidable fender-supporting members movable longitudinally of said guideways, a fender attached to and carried by said slidable members, and a substantially horizontal shaft journaled in bearings on said hangers and having a rack and pinion engagement with said vertically slidable fender-supporting members, and flexible limiting means interposed between each hanger and the respective slidable fender-supporting member.

In testimony whereof I affix my signature.

HENRY H. BARR.